June 2, 1942.　　　A. E. BRONSON　　　2,285,008
VALVE STEM
Original Filed Feb. 12, 1937　　2 Sheets-Sheet 1

INVENTOR.
BY Adelbert E. Bronson
Kwis Hudson & Kent
ATTORNEYS

June 2, 1942.  A. E. BRONSON  2,285,008
VALVE STEM
Original Filed Feb. 12, 1937  2 Sheets-Sheet 2
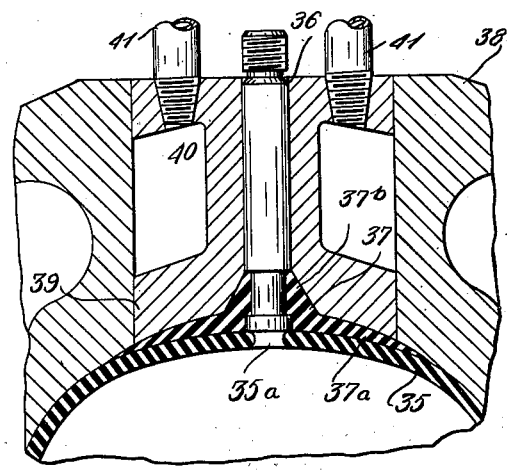
Fig. 13.
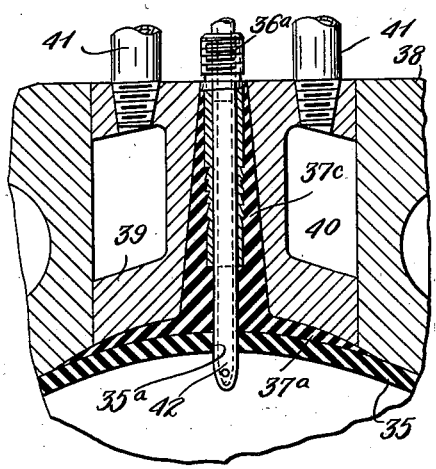
Fig. 14.
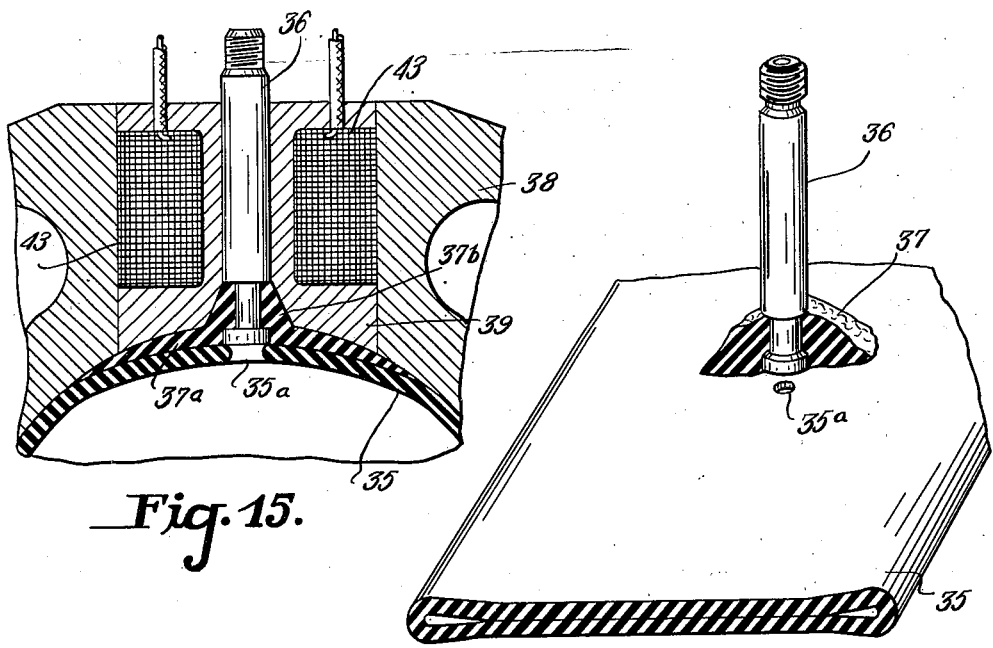
Fig. 15.
Fig. 12.
INVENTOR.
Adelbert E. Bronson
BY
Kwis Hudson & Kent
ATTORNEYS Patented June 2, 1942

2,285,008

UNITED STATES PATENT OFFICE 2,285,008

VALVE STEM

Adelbert E. Bronson, Shaker Heights, Ohio, assignor to The Dill Manufacturing Company, Cleveland, Ohio, a corporation of Ohio Original application February 12, 1937, Serial No. 125,465. Divided and this application October 22, 1938, Serial No. 236,504

7 Claims. (Cl. 152—430)

This invention relates to a valve stem particularly adapted for use with the inner tube of a pneumatic tire or with other inflatable rubber articles.

This application is a division of my application Serial No. 125,465, filed February 12, 1937, now Patent No. 2,230,879, issued February 14, 1941, which in turn is a continuation in part of my application Serial No. 39,593, filed September 7, 1935.

An object of the invention is to provide a valve stem which is simple in construction, and which may be expeditiously and economically manufactured and connected to the inner tube or other inflatable article upon which it is used.

There are now in use two general types of valve stems, namely, the all metal stem and the rubber valve stem. The rubber valve stem comprises a rubber base having an integral outstanding tubular portion in which is secured a tubular metal insert for receiving the valve insides or core. It has been customary to make these rubber stems separately from the manufacture of the tire tubes or articles upon which they are to be used; the stems being formed and at least partially vulcanized prior to attachment to the tubes. The rubber stems thus separately manufactured and vulcanized are secured to the tire tubes or other articles by means of cement or by vulcanization as is well known in the art.

As set forth in my said Patent No. 2,230,879, of which this application is a division, it is proposed to provide a most economical method of manufacturing and uniting rubber valve stems and tire tubes or other inflatable rubber articles and wherein the stems are formed of uncured rubber directly on the uncured tubes or articles and a single vulcanizing operation is employed to cure the stems and tubes or articles and to unite the same together, thereby eliminating separate and multiplied manufacturing operations or steps.

In the manufacture of rubber valve stems separately from the manufacture of tire tubes or other inflatable rubber articles and the subsequent uniting of the stems to the tubes or articles by vulcanization, a good attachment between the stems and articles or tubes does not always take place due to the fact that the stems may be constructed of rubber having different characteristics from the rubber of which the tubes or articles are constructed, and consequently there will not be uniform curing of the rubber in the tubes and the rubber in the stems during the vulcanization of the same to unite the stems to the tubes.

The method disclosed in my said Patent No. 2,230,879 relates to manufacturing rubber valve stems and tire tubes from compatible rubber stock and then by a single vulcanizing step curing the rubber of the stems and tubes and uniting the stems and tubes, thus insuring a good attachment between the bases of the stems and the tubes.

Another object is to provide a valve stem wherein the base of the stem is of improved and novel construction and of such character that it is relatively thin and can be permanently secured to the inner tube or other rubber article, and although conforming to the configuration of the tube or article will possess the desired and necessary strength.

Another object is to provide a valve stem which may be readily applied to any portion of the inner tube of a pneumatic tire or other rubber article and can be so secured to the tube or article as to become, in effect, an integral part thereof.

A further object is to provide a valve stem which can be vulcanized or integrally united to a tire tube or other rubber article and which is provided with a pliable insert formed of suitable material such as thin pliable sheet metal, wire fabric or screening, cord fabric or other and similar materials.

Another and important object is to provide a valve stem which has all the attributes of a rubber valve stem, but which is cheaper to manufacture and apply to a tire tube or other rubber article than is the ordinary rubber valve stem.

Another object is to provide a valve stem which, in addition to being vulcanized to the tire tube or other rubber article, has its base mechanically secured to the tube or article.

Further and additional objects and advantages not hereinbefore specified will become apparent hereinafter during the detailed description which is to follow of several embodiments of the invention.

Referring to the accompanying drawings.

Figure 1:
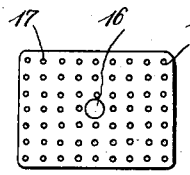
Fig. 1 is a detail plan view of one form of insert which may be used in the base of the valve stem.

Fig. 12 is a fragmentary perspective view of an uncured tire tube together with a valve stem, upon the lower end of which is mounted a piece of rubber stock which is compatible to the rubber stock of the tube and said view illustrates the manner in which the valve stem and tube are positioned together in carrying out the method later to be referred to herein, the piece of rubber on the stem being shown in section.

Fig. 13 is a fragmentary sectional view through a curing mold such as a mold of the watch case type, and shows the tire tube and valve stem arranged in the mold and being cured by a single vulcanizing or curing process.

Fig. 14 is a view similar to Fig. 13 but illustrates a different form of valve stem from that shown in Fig. 13, in that the rubber of the stem extends outwardly of the stem to adjacent the threaded nipple at the outer end of the metal insert or member for the valve core or insides; a hollow needle also being shown as used to perforate the piece or chunk of rubber and the tube and through which fluid pressure is introduced to inflate the tube.

Fig. 15 is a view similar to Fig. 13 but illustrates a slightly modified form of mold and one wherein an electrical heating unit is employed for imparting the requisite heat for vulcanization to the rubber of the valve stem.

The invention set forth in my said Patent No. 2,230,879, contemplates an improved method of manufacturing valve stems and tire tubes and which is of such character as to be very economical, in that but a single vulcanization step is required for curing the stems and tubes and uniting the same together and which also possesses the advantage that the bases of the stems and the tubes or inflatable articles can be made of compatible rubber stock whereby the vulcanization of the same effects a good attachment therebetween.

Briefly, the method comprises the formation of a tire tube from rubber stock and then upon this tube is positioned a tubular member adapted to receive a valve core or insides, and upon the lower end of which is mounted a piece or chunk of rubber stock that is compatible to the rubber stock of the tube. The piece of rubber stock on the member when pressed against the rubber tube will act to hold the member in position and enable the tube and member to be placed in a curing mold, wherein the valve stem base is formed and the tube and stem and particularly its base are cured by a single curing operation, which also acts to permanently and securely unite the base of the stem to the tube and form an integral unit therewith. In carrying out this method, and in order to provide uniform curing or vulcanization in the rubber of the tube and the rubber of the stem, it is desirable to subject the rubber of the stem to heat applied in close proximity thereto, since the stem is usually thicker than the tube and would otherwise require a longer time for curing or vulcanization than the tube, and particularly since the stem extends through the mold and is utilized for inflating the tube so that it would not ordinarily be subjected to heat applied in close proximity thereto unless provision were made therefor. The method contemplated by the invention claimed in my said Patent No. 2,230,879 will be explained in greater detail hereinafter.

The invention further contemplates a valve stem construction which includes an insert to which the stem is suitably secured and which is formed of a suitable pliable material having sufficient strength to provide a strong reenforcement in the attachment of the valve stem to a tire tube or other rubber article, and in addition to providing an attachment of the stem to the tube or article by vulcanization, also provides a mechanical attachment between the stem and tire tube or article. Although the insert for the base of the valve stem, as referred to above, may be of various pliable materials, it is preferred to employ such materials as thin pliable sheet metal, wire cloth or screening, cord fabric or other suitable materials, and accordingly illustrations of embodiments of the invention utilizing these materials have been shown in the drawings and will be described herein by way of example.

Figure 2:
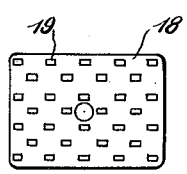
Fig. 2 is a view similar to Fig. 1 but illustrates another form of insert for the valve stem base.

In Figs. 1 and 2 there are illustrated inserts for the bases of the valve stem in the form of pieces of thin pliable sheet metal, such as sheets of thin brass or copper or any other metal to which rubber can be made to adhere. In Fig. 1 the insert 15 is provided with an opening 16, preferably arranged centrally thereof and adapted to receive the end of the valve stem, which is provided with a reduced extension that projects through and slightly beyond the under side of the insert. The insert 15 is also provided with a plurality of small perforations 17, the purpose of which will later be more fully set forth. The insert 18 shown in Fig. 2 is similar to the insert 15, except that it is provided with a plurality of oblong or rectangular openings 19 and which are preferably arranged in staggered or off-set relation to each other. The metal valve stem 20 may be of usual construction and, as will be understood, is adapted to receive the customary valve core or valve insides, and said stem is mounted on the inserts 15 or 18 by the reduced extension at the inner end of the stem extending through the opening 16, and the stem and insert are then secured together by brazing, electric welding or by otherwise suitably securing the stem in position as indicated at 21 in Fig. 3.

A valve constructed of the stem 20 and either the insert 15 or the insert 18 with the stem and insert connected together by brazing or other means previously referred to can be secured to a tire tube 35 in the following manner: The insert preferably, but not necessarily, is dipped into a suitable solution to which rubber will adhere, such as rubber cement, and is then dried. As will be explained more in detail hereinafter, the valve stem would preferably be secured to the tire tube by positioning the insert on any desired part of the crude rubber tube during the manufacture of the latter, after which a piece or patch of crude rubber stock would be placed over the insert and stem and then when the tube was vulcanized or cured the base or patch of crude rubber stock would be formed into shape and cured simultaneously with the tube, and the insert, stem and patch or base would become an integral part of the tube with the insert lying between the outer side of the tube and the under side of the patch or base, although, of course, after vulcanization the patch and tube would, in effect, become substantially a single piece of rubber.

Figure 3:
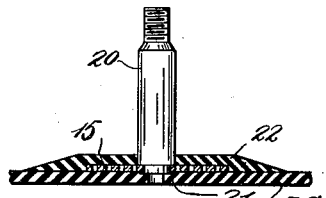
Fig. 3 shows a valve stem secured to the insert illustrated in Fig. 1 and a rubber base applied to the insert and stem and is partly a sectional view through a tire tube to which the stem and base have been secured.

Referring to Fig. 3, the patch or base which has been previously mentioned is indicated at 22, and the manner in which it will be arranged over the insert and vulcanized to the tube can readily be ascertained from an inspection of this view.

Figure 4:
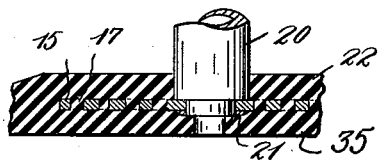
Fig. 4 is a fragmentary sectional view similar to Fig. 3 but on an enlarged scale to illustrate the mechanical union between the base of the valve stem and the tire tube.

In Fig. 4 which is a view similar to Fig. 3 but on an enlarged scale, the patch or base 22 and tube 35 are shown as vulcanized or united together, and it will be noted that the rubber of the patch and tube has passed through the perforations 17 of the insert wherefore the base of the stem is mechanically united to the tube by a multiplicity of rubber rivets extending through the insert and is, in addition, connected to the tube by the fusion of the rubber of the patch or base and of the tube brought about by the simultaneous vulcanization or curing thereof. In Fig. 4 the insert shown therein is the insert 15 with the small round perforations 17, but it will be understood that the rubber of the tube and patch or base will extend through the rectangular or oblong openings 19 of the insert 18 in a similar manner.

It will also be observed that the thin pliable insert is secured to the tube 35 in such manner as to insure an airtight connection between the base of the stem and tube even though there might not be a perfect adhesion of the rubber of the tube and patch or base to the insert after vulcanization, since, as it will be remembered, the base of the stem is united to the tube by the multiplicity of rivets extending through the openings of the insert, and further because the end of the stem is secured to the insert by brazing, electric welding, soldering or other similar means which guarantee an air-tight connection between the stem and insert.

Figure 5:
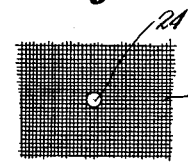
Fig. 5 is a view similar to Fig. 1 but illustrates a different form of insert for the valve stem base.

In Fig. 5 the insert 23 is shown as formed of suitable wire cloth or wire screening, and such insert when connected with the stem and mounted on the tube in the manner set forth previously will function in exactly the same way as would the first mentioned inserts, since the rubber of the patch or base and tube will, after being cured, extend through the meshes of the insert 23 and form a mechanical connection between the base and tube. The stem 20 can be secured to the insert 23 in various suitable ways, but, as shown herein, the reduced extension on the end of the stem passes through the opening 24 in the insert and receives a thin metal washer 25 which is brazed, soldered or otherwise connected to the stem and to the insert, so that the stem, insert and washer when assembled together constitute a mechanical unit.

During the securing of the stem and insert to the tire tube 35 the insert can be placed on any part of the tube as previously mentioned together with the crude rubber patch, or base and the tube can then be pierced or inflated by suitable means, if it is not previously provided with an opening, as for example, by applying through the valve stem hole a hollow electric needle which will pierce the tube and thus permit, through the stem, inflation of the tube for vulcanization.

Figure 6:
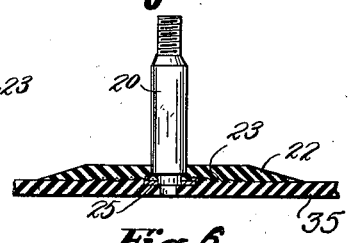
Fig. 6 is a view similar to Fig. 3 and shows a valve stem secured to the insert shown in Fig. 5 and the stem and base mounted on a tire tube with a fragmentary portion of the latter shown in section.
Figure 7:
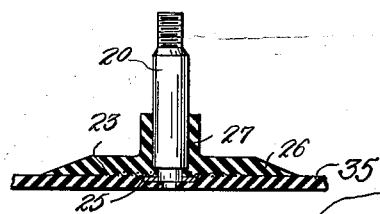
Fig. 7 is a view similar to Fig. 6 but shows a different form of valve stem base from that shown in Fig. 6.
Figure 8:
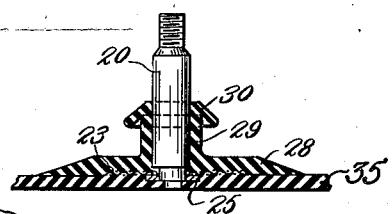
Fig. 8 is a view similar to Figs. 6 and 7 and shows a still different form of valve stem base from those shown in either of said views.

In Figs. 3, 4 and 6 the rubber patch or base 22 has been shown as a plain or substantially flat patch, but it should be understood that the patch may take various forms as desired. As illustrative of the different forms which the rubber patches or bases may take, reference should be made to Figs. 7, 8 and 9. In Fig. 7 the patch or base 26 is shown as provided with a centrally arranged upstanding boss 27 surrounding the valve stem and which would when a tube having the stem and patch secured thereto is mounted on a rim, extend through the rim opening and act to centralize the stem in the opening. In Fig. 8 the patch or base 28 is provided with a central outstanding boss 29, similar to the boss 27, but having at its outer end an out-turned conical flange 30 which when the stem and boss pass through the rim opening is compressed to allow such passage and then expands to engage the outer side of the rim adjacent to the rim opening and acts to seal said opening against the entrance of dirt, moisture or other foreign matter.

Figure 9:
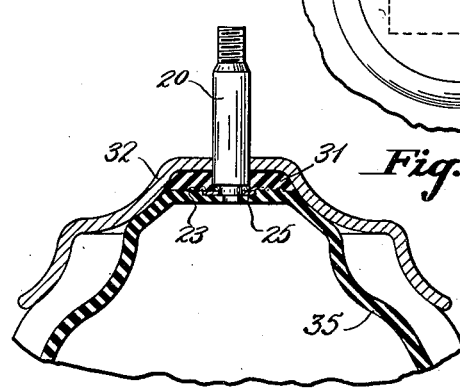
Fig. 9 is a sectional view through a tire rim with a tire casing and tube mounted thereon and illustrates a valve stem embodying the present invention and employing a still different form of valve stem base from any which have been previously shown.

In Fig. 9 the patch or base 31 is shaped as to have the form of a drop-center rim 32, which when the tube 35, stem and patch or base are mounted on the rim fills the drop center of the latter adjacent the rim opening and acts to brace and support the tube at this point.

It will be understood that the patch which is employed in various instances can vary in structure to suit particular conditions and that the specific forms of patches or bases shown herein should not be construed as limiting the present invention thereto, but are illustrated and described merely by way of example.

Figure 11:
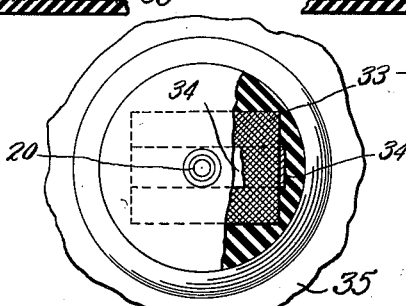
Fig. 11 is a top plan view of Fig. 10 with a portion of the valve stem base broken away so as to illustrate the insert of the base.
Figure 10:
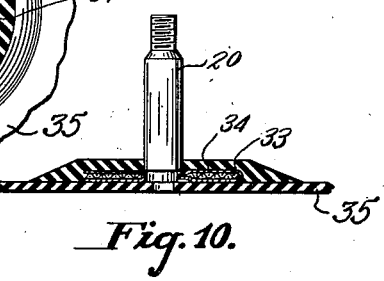
Fig. 10 is a view similar to Figs. 3, 6, 7 and 8 but illustrates a different form of valve stem base and insert therefor from those shown in the previous views.

A further embodiment of the invention is illustrated in Figs. 10 and 11, wherein the insert 33 is formed of cord fabric, such as the cord fabric employed in the manufacture of cord tire casings or any other cord fabric of suitable strength and structure. The stem 20 may be secured to the cord fabric insert 33 by means of a thin metal strip 34 of substantially the same width as the diameter of the stem 20 and which envelopes the cord fabric insert 33 by being bent so as to lie above and below said insert. The end of the stem passes through openings in both branches of the metal strip and through the cord fabric insert and the strip and stem are then united by brazing, electric welding, soldering or other suitable means which has been previously referred to. The insert 33, strip 34 and stem 20 can be secured to a tire tube as explained in connection with the other embodiments of the invention heretofore described.

Although the pliable bases heretofore referred to have been illustrated and described as provided with central openings, which arrangement may be advantageous for locating the stems, it will be understood that the central openings are not essential since the stems can be welded, soldered, brazed or otherwise secured to pliable bases that are not provided with central openings.

Although the embodiments of the invention which have been previously described herein have all included reenforcing inserts for the bases of the stems, it is not necessary that such insert be employed and perhaps, in accordance with my present point of view, it would be preferable to omit such inserts in some instances and to connect the stem to the tube by merely employing a rubber base without the reenforcing insert thereby effecting an additional economy in manufacture. A construction of this character will be described in connection with the explanation of the method of manufacturing the tire tube and valve stems and uniting the same into a single, integral structure. The method will now be described in detail with particular reference to Figs. 12 to 15 of the drawings.

As previously stated, the invention covered by my said Patent No. 2,230,879, contemplates a method of manufacturing tire tubes or other inflatable rubber articles and rubber valve stems therefor and wherein the tubes and stems are integrally united by a single vulcanizing operation which simultaneously cures the rubber of the tube and stem and integrally unites the base and tube to provide for a permanent attachment of the stem to the tube. As will become apparent during the description of the method, a resultant economy is effected thereby due to the elimination of separate vulcanization steps, and furthermore the attachment of the stem to the tube is of improved efficiency, since the rubber of the stem and of the tube will have substantially the same characteristics and can be uniformly vulcanized so that the attachment therebetween can be a permanent and secure one and will possess the requisite strength to obviate the danger of the stem pulling off of the tube.

In carrying out the method a tube indicated at 35 in Fig. 12 is formed of rubber stock. A metal valve stem 36, to the inner end of which rubber cement may be applied if desired, is then positioned in the desired location upon the tube 35 by means of a piece or chunk of rubber stock 37, that is compatible with the rubber stock of the tube. The piece or chunk of rubber stock 37 will adhere to the rubber of the tube and hold the stem in position, so that the tube with the stem thereon, can be placed in a vulcanizing mold. The tube may be provided with an opening 35a, and the stem so positioned on the tube that its bore will register with said opening or the tube may be made without an opening and then pierced after the stem has been arranged thereon by suitable means that is inserted through the stem, such for example, as an electric needle as previously described herein. The uncured tube 35, with the stem 36 and piece or chunk of compatible rubber stock 37 in position thereon, is then placed in a suitable vulcanizing mold, such as a mold of the watch case type, as indicated at 38 in Figs. 13, 14 and 15. The stem 36, as is well understood in the art, will extend through the mold and is adapted to receive upon its threaded outer end or nipple a coupling member of a fluid pressure supply line, whereby when the mold is closed the tube can be inflated for its vulcanization within the mold. The mold 38 will be provided, at the portion thereof through which the stem extends, with a plug 39, which might be either a separate plug member secured in the mold, or could be integrally formed as a part of the mold, and which would have cut therein a suitable bore through which the stem 36 would extend and which bore communicates at its inner end with a suitably shaped recess formed in the portion 39 for forming the piece or chunk of rubber stock 37 into the desired shape of the rubber valve stem. In this connection it might be well to point out that the piece or chunk of rubber stock 37, if desired could be partially preformed into the approximate shape before the tube was mounted in the mold, or it could without any preforming thereof be shaped by the recess formed in the portion 39 of the mold when the tube was inflated for the vulcanization process. It is essential that the tube and the base and other portions of the rubber stem be uniformly vulcanized during the vulcanization process. Inasmuch as certain portions of the rubber stem would not ordinarily be subjected to the same degree of heat as would the tube, due to the construction of the mold and the fact that such portions are removed from the vulcanization chamber, it is proposed to subject the rubber of the stem to a source of heat which might be said to be independent of the source of heat for the vulcanization of the tube. This is also desirable, inasmuch as the rubber of the stem is usually thicker than the rubber of the tube, and hence would customarily require a greater length of time to be vulcanized to the same degree as the rubber of the tube. As is well understood in the art, vulcanizing molds are usually provided with a steam circulating chamber around the article being vulcanized and in which steam is injected and circulated and in carrying out the present method that portion of the mold through which the stem extends could be, if desired, provided with cored out passages or chambers communicating with the usual steam circulating chamber of the mold, wherefore the steam would circulate about the valve stem in close proximity thereto.

However, as illustrated in Figs. 13 and 14, the portion 39 of the mold 38 is provided with a chamber 40 surrounding the valve stem, but not in communication with the usual steam chamber of the mold. A suitable heating agent, such as superheated steam, would be introduced into and circulated through the chamber 40 by means of conduit pipes 41 connected with the chamber and with a supply source for the heating agent. In this way it assured that a sufficient degree of heat would be applied to the stem in close proximity thereto so that the rubber of the stem would be vulcanized to the same degree as the rubber of the tube in a given period of time.

From the foregoing it will be understood that when the tube is in the mold and is inflated the pressure of the fluid within the tube will force the chunk or piece of crude rubber 37 into the recess formed in the portion 39 of the mold and impart to said piece or chunk of rubber the desired shape. Also the mold might be so constructed at the portion 39 as to exert mechanical pressure on the piece or chunk of rubber. As illustrated in Fig. 13, the piece or chunk of rubber 37 when brought into its final form includes a base portion 37a, together with a tapered boss portion 37b that extends a short distance around the inner end of the stem 36, the major portion of which will not be covered by rubber. The simultaneous vulcanization or curing of the rubber of the tube and of the piece or chunk of rubber 37 acts to unite the base 37a and the tube 35 into an integral unit and also effects the desired adhesion of the piece of rubber 37 to the valve stem 36, wherefore when the tube is removed from the mold the valve steam will be an integral part thereof and will be so firmly secured thereto as to have the requisite strength for the uses to which it will be subjected.

In Fig. 14 a different form of valve stem which may be constructed by the present invention is illustrated than that shown in Fig. 13. The valve stem shown in Fig. 14 is provided with a rubber tubular portion 37c that extends substantially the full length of the stem, that is, to adjacent the threaded nipple at the outer end of the stem. In place of the stem 36 a shorter tubular member or insert 36a is arranged in the rubber portion 37c and this member corresponds to the usual metal insert employed in rubber valve stems and adapted to receive the valve insides of the core. In utilizing the present method for forming a valve stem, such as shown in Fig. 14, a piece of uncured rubber stock is positioned about the insert 36a and is of such size that when it is formed up it will cover the insert as illustrated and will also provide sufficient stock to form the base and the lower part of the portion 37c. This piece of rubber with the insert therein can be positioned upon the crude rubber tube which, in the present instance, has not been provided with an opening 35a. A hollow needle 42 is passed through the insert 36a and through the piece or chunk of rubber and the tire tube, as clearly shown in Fig. 14, and the outer end of this needle can be connected to a supply line for fluid pressure, wherefore the fluid pressure for inflating the tube and forcing the piece of rubber stock into the required shape, that is into the shape having the base 37a and the portion 37c that extends into the tapered bore through the part 39 of the mold, can be injected into the tube through the needle 42. When this has taken place the tube and the piece of rubber stock are simultaneously curved by the application of heat as described in connection with Fig. 13, and after the curing operation the needle 42 can be removed and the tube with the valve stem integrally united therewith and forming a part of the tube, can be removed from the mold.

In Fig. 15 the valve stem shown corresponds to that shown in Fig. 13, in that the rubber base of the stem is provided with a short boss 37b extending partly the length of the stem 36. However, in place of using a steam chamber 40 for providing the desired heat for the vulcanization of the rubber of the stem, electrical heating units 43 are arranged in the portion 39 of the mold for this purpose.

From the foregoing description it will be seen that a valve stem and tube can be constructed in accordance with the present invention very economically, in that the rubber of the tube and stem is simultaneously cured in a single operation, as distinguished from separate curing operations; it being remembered that rubber valve stems heretofore have been semi-cured by a separate curing operation before they are applied to the tire tubes. Also, since compatible rubber stock can be used for forming the stems and tubes, a uniform vulcanization thereof can be obtained with a resultant improvement in the attachment of the bases of the stems to the tubes.

The term "compatible" rubber stock as used herein and in the claims is meant to convey the meaning that the rubber stock of the tube and stem will have similar or mutual vulcanizing characteristics and will not act disadvantageously to each other when subjected to the heat of vulcanization.

The manner in which the bases of the stems are secured to the tubes insures an air-tight connection therebetween and one which will possess the requisite strength in service.

Although the invention has been specifically illustrated and described in detail with reference to a tire tube, it should be understood that it may be equally as effectively utilized for various other inflatable rubber articles.

Although several preferred embodiments of the invention have been illustrated and described herein, it should be understood that the invention is susceptible of various modifications and adaptations within the scope of the appended claims.

Having thus described my invention I claim:

1. In combination with a rubber article, a stem, a separate thin pliable perforate insert permanently secured to said stem and positioned on the exterior of the article, and a rubber patch or base arranged over said insert and article and vulcanized to the latter wherefore said insert will be mechanically united to the article by the rubber of the patch or base and article extending through the perforations therein.

2. In combination with a rubber article, a valve stem, an insert non-detachably secured to said stem and formed of wire fabric and positioned on the exterior of the article, and a rubber base or patch arranged over said insert and article and vulcanized to the latter wherefore said insert will be mechanically united to the article by the rubber of the patch and article extending through the base.

3. In combination with a rubber article, a valve stem having a reduced inner end, a thin pliable perforate insert provided with an opening receiving the reduced end of the stem, said stem and insert being non-detachably secured together and said insert being positioned on the exterior of the article, and a rubber patch or base arranged over said insert and article and vulcanized to the latter wherefore said insert will be mechanically united to the article by the rubber of the patch and article extending through the perforations therein.

4. A valve stem comprising a thin pliable perforate metal member, and a stem permanently secured to said member.

5. A valve stem comprising a member formed of pliable wire fabric, and a stem permanently secured to said member.

6. A valve stem comprising a member formed of pliable sheet metal and provided with a plurality of staggered openings and a valve stem permanently secured to said member.

7. A valve stem comprising a member formed of cord fabric and a pliable sheet metal strip, and a separate stem permanently secured to said fabric and strip.

ADELBERT E. BRONSON.